US011830021B2

(12) United States Patent
Peters et al.

(10) Patent No.: US 11,830,021 B2
(45) Date of Patent: Nov. 28, 2023

(54) POINTS MANAGEMENT SYSTEM

(71) Applicant: Synchrony Bank, Stamford, CT (US)

(72) Inventors: Gregg Peters, Draper, UT (US); Adam Lawson, Draper, UT (US); Senthil Krishnasamy, Draper, UT (US); Beth Stephens, Draper, UT (US); Vivek Menon, Draper, UT (US); Sajith Ravindranath, Draper, UT (US); Balamourougan Ranganathan, Draper, UT (US); Terril Bryan, Draper, UT (US)

(73) Assignee: SYNCHRONY BANK, Stamford, CT (US)

( * ) Notice: Subject to any disclaimer, the term of this patent is extended or adjusted under 35 U.S.C. 154(b) by 73 days.

(21) Appl. No.: 17/199,679

(22) Filed: Mar. 12, 2021

(65) Prior Publication Data
US 2021/0201342 A1 Jul. 1, 2021

Related U.S. Application Data

(63) Continuation of application No. 16/127,099, filed on Sep. 10, 2018, now abandoned.

(51) Int. Cl.
G06Q 30/00 (2023.01)
G06Q 30/0207 (2023.01)
G06Q 20/10 (2012.01)

(52) U.S. Cl.
CPC ....... *G06Q 30/0215* (2013.01); *G06Q 20/102* (2013.01); *G06Q 30/0239* (2013.01)

(58) Field of Classification Search
None
See application file for complete search history.

(56) References Cited

U.S. PATENT DOCUMENTS 6,138,911 A * 10/2000 Fredregill .......... G06Q 30/0241
902/22
2005/0021401 A1 1/2005 Postrel
(Continued)

OTHER PUBLICATIONS

What is caching and how it works, Aug. 30, 2018, aws.amazon.com, printed through www.archive.org, date is in URL in YYYYMMDD format (Year: 2018).*
(Continued)

*Primary Examiner* — Naresh Vig
(74) *Attorney, Agent, or Firm* — Polsinelli LLP

(57) ABSTRACT

A method for use an earned autopay account, an available autopay account, an earned points account, and an available points account each associated with a customer. The method includes storing a cache including first and second numbers of points stored in the available autopay account and the available points account, respectively. A points authorization request requesting a first transaction amount is received from a requesting computing device. A second transaction amount is subtracted from the first and/or second numbers of points. A points redemption request including a third transaction amount is sent to the payment processing computing device. Each of the first, second, and third transaction amounts includes a particular monetary value and/or a corresponding transaction number of points. The payment processing computing device subtracts the third transaction amount from the available points account and/or the available autopay account.

21 Claims, 4 Drawing Sheets

(56) References Cited

U.S. PATENT DOCUMENTS

| | | | |
|---|---|---|---|
| 2005/0149394 A1 | 7/2005 | Postrel | |
| 2008/0133350 A1* | 6/2008 | White | G06Q 20/20 |
| | | | 705/14.27 |
| 2010/0057551 A1* | 3/2010 | Blaisdell | G06Q 20/387 |
| | | | 705/14.27 |
| 2010/0057553 A1* | 3/2010 | Ameiss | G06Q 30/02 |
| | | | 705/14.32 |
| 2015/0112781 A1* | 4/2015 | Clark | G06Q 30/0215 |
| | | | 705/14.17 |
| 2018/0341971 A1* | 11/2018 | Shah | G06Q 30/0229 |

OTHER PUBLICATIONS

Steven Testone, How to build one page website, Sep. 18, 2017, SnapPages.com (Year: 2017).*

How to create a website and earn money, Oct. 18, 2017, WikiHow.com, printed through www.archive.org, date is in URL in YYYYMMDD format (Year: 2017).*

Pay with Cashback Bonus, Dec. 22, 2016, Discover Bank (Year: 2016).

Discover it Card Cashback Bonus, Sep. 30, 2017, Discover Bank (Year: 2017).

Office Action dated Jun. 10, 2020 in U.S. Appl. No. 16/127,099.

* cited by examiner

POINTS MANAGEMENT SYSTEM

CROSS-REFERENCE TO RELATED APPLICATION

This application is a continuation of U.S. patent application Ser. No. 16/127,099, filed on Sep. 10, 2018, which is incorporated in its entirety herein by reference.

BACKGROUND OF THE INVENTION

Field of the Invention

The present invention is directed generally to methods and systems for redeeming points.

Description of the Related Art

Points, such as loyalty points, may be earned by a user. For example, points may be earned by shopping with a particular merchant and applied toward rewards offered by that merchant. Points earned are typically calculated and tracked by a points processing system. Some types of points have a monetary value and may be spent with the merchant instead of or along with conventional payment methods (e.g., currency, credit, etc.).

Some points processing systems allow the user to specify that the user's points be used to pay the user's credit card balance automatically. In other words, at some point after the points have been earned, the points processing system will use them to pay down the user's credit card balance. Unfortunately, a common technical limitation of such points processing systems is that they automatically apply all of the points earned by the user toward the user's credit card balance. In other words, if the user has decided to apply the user's points toward the user's credit card balance, the user is prohibited from redeeming at least a portion of the user's points toward future purchases.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
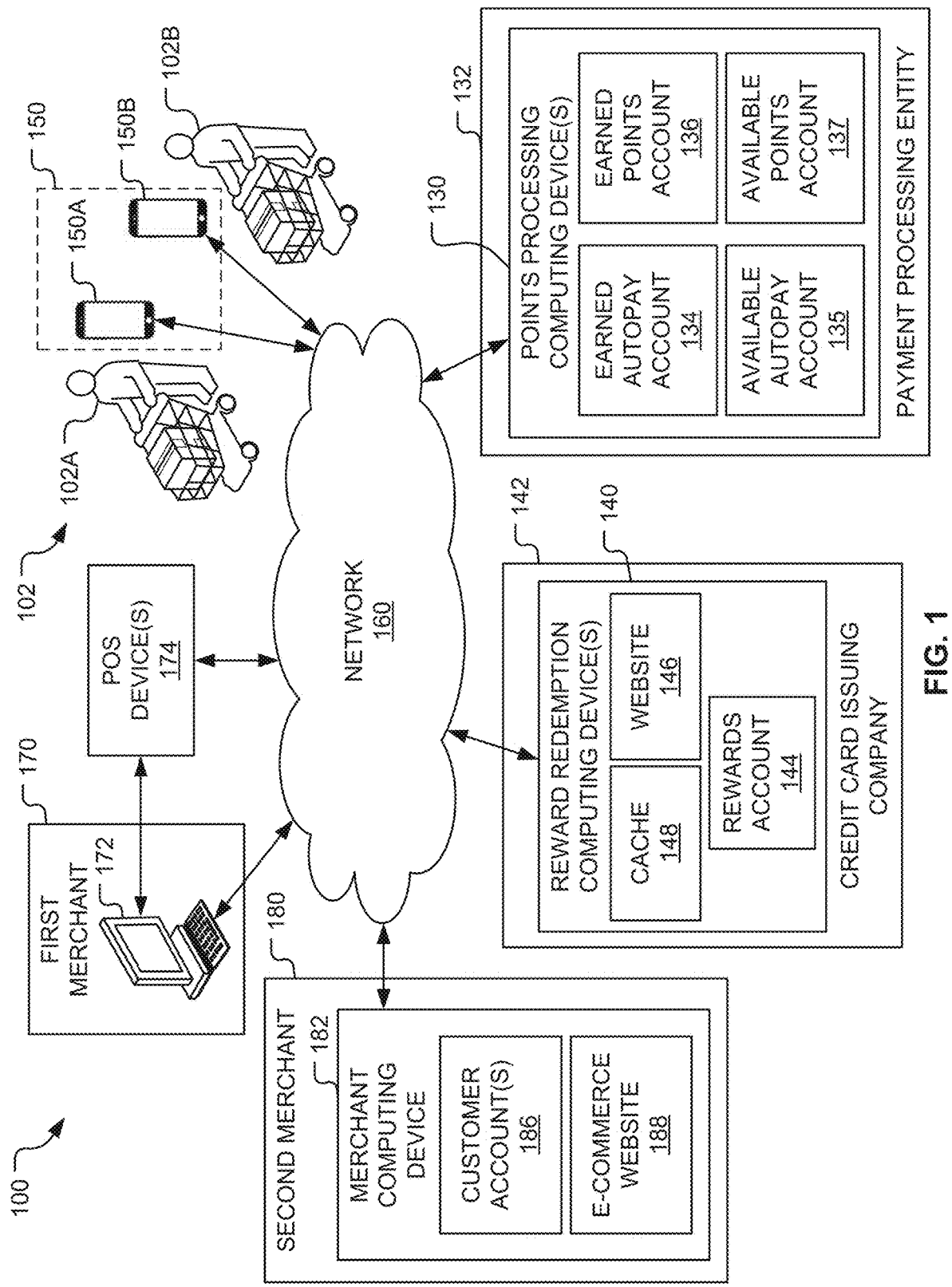
FIG. 1 is a diagram of a system for managing points earned by customers.

FIG. 1 is a system 100 for managing points earned by a plurality of customers 102. The system 100 includes at least one points processing computing device 130 operated by a points processing entity 132, at least one reward redemption computing device 140 operated by a credit card issuing company 142, and customer computing devices 150 operated by the customers 102. While the customer computing devices 150 have been illustrated as including the two customer computing devices 150A and 150B operated by the two customers 102A and 102B, respectively, the system 100 may include any number of customer computing devices, like the customer computing devices 150, operated by any number of customers.

The points processing computing device(s) 130 may store or have access to an earned autopay account, an available autopay account, an earned points account, and an available points account for each of the customers 102. For ease of illustration, FIG. 1 depicts the points processing computing device(s) 130 storing or accessing an earned autopay account 134, an available autopay account 135, an earned points account 136, and an available points account 137 each associated with only the customer 102A. Each of the accounts 134-137 is configured to store points. The earned autopay account 134 and the earned points account 136 both store points that have been earned by the customer 102A but cannot yet be used. On the other hand, the available autopay account 135 and the available points account 137 both store points available for use.

The reward redemption computing device(s) 140 may store or have access to a rewards account for each of the customers 102. The reward account may be a credit card account. For ease of illustration, FIG. 1 depicts the reward redemption computing device(s) 140 storing a rewards account 144 (e.g., a credit card account) associated with only the customer 102A. The rewards account 144 may store an outstanding negative balance due or a positive credit that may be used to toward future purchases.

The reward redemption computing device(s) 140 may store or have access to a local data cache 148. For example, the cache 148 may be stored in a database connected to the reward redemption computing device(s) 140. Optionally, the rewards account 144 may be stored in the cache 148. The cache 148 is remote from the points processing computing device(s) 130. The reward redemption computing device(s) 140 may be configured to generate a website 146 that may be used to turn on autopay (described below).

The points processing computing device(s) 130 determine(s) how many points have been earned by each of the customers 102. For example, the points processing computing device(s) 130 may monitor purchases made by the customer 102A and reward a particular number of points to the customer 102A based on those purchases. In the case of a loyalty system, for example, the points processing computing device(s) 130 may award points based on purchases made at a first merchant 170 and/or a second merchant 180. Alternatively, the points processing computing device(s) 130 may award points based on purchases made using the rewards account 144. In such an implementation, the points may be redeemable at the first merchant 170 and/or the second merchant 180. In the embodiment illustrated, the first merchant 170 operates at least one merchant computing device 172, which may be configured to generate a website (not shown) at which the purchases may be made. Similarly, the second merchant 180 may operate at least one merchant computing device 182, which may be configured to generate an e-commerce website 188 at which the purchases may be made. The first merchant 170 may also operate one or more point of sale ("POS") devices 174 (e.g., cash registers, kiosks, and the like) at which the purchases may be made.

The devices 130, 140, 150, 172, 174, and 182 are operable to communicate with one another over a network 160. By way of a non-limiting example, the devices 130, 140, 150, 172, 174, and 182 may each be implemented as a computing device 12 illustrated in FIG. 4 and described below.

When one of the customers 102 makes a purchase with the first merchant 170, the POS device(s) 174 and/or the merchant computing device(s) 172 may communicate a user identifier for the customer along with identifications of purchases made by the customer to the points processing computing device(s) 130 and/or the reward redemption computing device(s) 140. In embodiments in which this information is communicated to the reward redemption computing device(s) 140, the reward redemption computing device(s) 140 may forward this information to the points processing computing device(s) 130. The points processing computing device(s) 130 use(s) this information to determine how many points have been earned by the customer associated with the user identifier.

Points are earned between credit card billing cycles. Points become available for use after a completion of a first billing cycle immediately following their having been earned. Each point awarded is associated with and/or assigned a monetary value. The monetary value of a number of points may be calculated by multiplying the points by a conversion value. The customers 102 may spend their points with the second merchant 180 and/or use the points to pay their respective outstanding debts. The merchant computing device(s) 182 may store or have access to one or more customer accounts associated with each of the customers 102. In FIG. 1, the merchant computing device(s) 182 are illustrated storing or having access to one or more customer accounts 186 each associated with the customer 102A. The customer 102A may have created the customer account(s) 186 through interaction with the e-commerce website 188.

Figure 2:
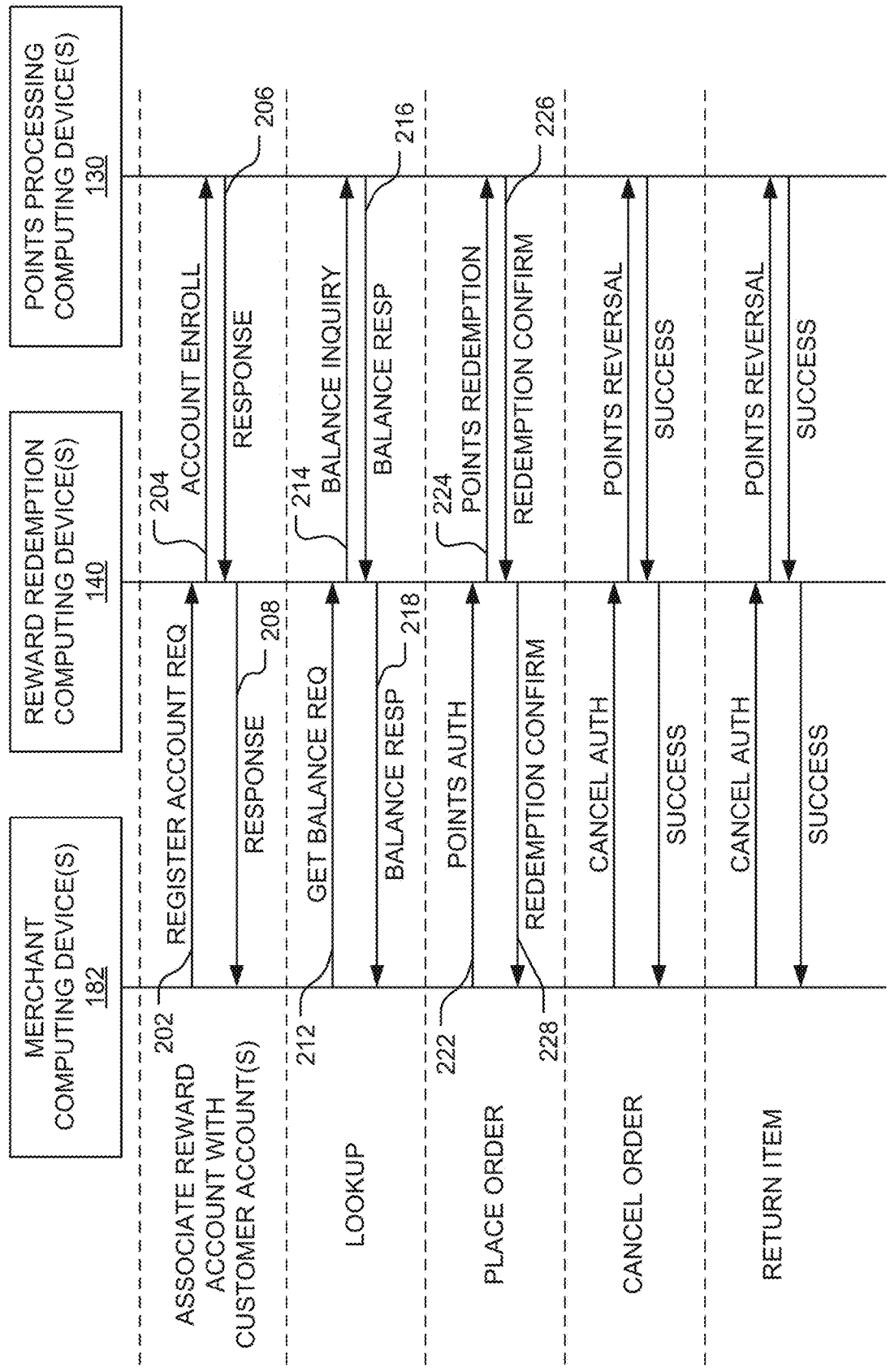
FIG. 2 is a diagram showing interaction between points processing computing device(s), reward redemption computing device(s), and a merchant computing device of the system of FIG. 1.

As shown in FIG. 2, the customer 102A (see FIG. 1) may associate the rewards account 144 (see FIG. 1) with the customer account(s) 186 (see FIG. 1). To do so, referring to FIG. 1, the customer 102A may log into the customer account(s) 186 (e.g., using the e-commerce website 188) and request that the rewards account 144 be associated with the customer account(s) 186. Referring to FIG. 2, the merchant computing device(s) 182 send a register account request 202 to the reward redemption computing device(s) 140. The reward redemption computing device(s) 140 forward an account enrollment message 204 to the points processing computing device(s) 130. The points processing computing device(s) 130 respond to the reward redemption computing device(s) 140 with a response message 206. The reward redemption computing device(s) 140 receive the response message 206. If the response message 206 indicates the customer account(s) 186 has been successfully associated with the rewards account 144, the reward redemption computing device(s) 140 record the association and forward a response message 208 to the merchant computing device(s) 182 indicating the customer account(s) 186 has been successfully associated with the rewards account 144. On the other hand, if the response message 206 indicates the customer account(s) 186 has not been successfully associated with the rewards account 144, the reward redemption computing device(s) 140 forwards the response message 208 to the merchant computing device(s) 182, which indicates the customer account(s) 186 has not been successfully associated with the rewards account 144.

Referring to FIG. 1, the customers 102 may use their points to pay at least a portion of the outstanding negative balance due in their rewards accounts. For example, the customer 102A may pay the customer's outstanding negative balance due in the rewards account 144 by logging onto the website 146 (e.g., using the customer computing device 150A) and instructing the reward redemption computing device(s) 140 to apply a selected amount of the customer's points to the rewards account 144. The reward redemption computing device(s) 140 forwards this information to the points processing computing device(s) 130, which transfer the points as instructed.

Alternatively, the customer 102A may turn on automatic payment or autopay. If the customer 102A has turned on autopay, any points stored in the available autopay account 135 are automatically transferred to the rewards account 144 after a completion of a second billing cycle immediately following the first billing cycle. If the monetary value of the points stored in the available autopay account 135 exceeds the outstanding negative balance, the overage may reside as a positive credit in the rewards account 144.

To turn on autopay, the customer 102A may use the website 146 to instruct the reward redemption computing device(s) 140 (e.g., using the customer computing device 150A) to apply the points stored in the available autopay account 135 automatically to the rewards account 144. The reward redemption computing device(s) 140 forwards this information to the points processing computing device(s) 130, which turns on autopay as instructed. Thus, the reward redemption computing device(s) 140 is configured to instruct the points processing computing device(s) 130 to implement autopay as described below with respect to a method 300. In this manner, both the reward redemption computing device(s) 140 and the points processing computing device(s) 130 are configured to implement autopay.

When the customer 102A has turned on autopay and earns one or more points, the points processing computing device(s) 130 stores the point(s) in the earned autopay account 134. After the completion of the first billing cycle, the points processing computing device(s) 130 transfers any points stored in the earned autopay account 134 to the available autopay account 135. Then, after the completion of the second billing cycle following the first billing cycle, the monetary value of the points stored in the available autopay account 135 are automatically applied to the rewards account 144. The monetary amount may pay up to an amount owed, if one is present, and/or appear as a credit. Thus, the points processing computing device(s) 130 is configured to apply all of the funds stored in the available autopay account 135 automatically to the rewards account 144.

Therefore, if the customer 102A wants instead to redeem the points toward a purchase, the points cannot be stored in the available autopay account 135 or must be moved from the available autopay account 135 before they are applied to the rewards account 144. For this reason, as mentioned above, the points processing computing device(s) 130 stores the earned points account and the available points account for each of the customers 102.

For the customer 102A, the rewards account 144 is associated with the available autopay account 135 and the available points account 137. As mentioned above, the customer account(s) 186 is/are associated with the rewards account 144. Thus, a monetary value of the points stored the available autopay account 135 and/or the available points account 137 may be used to pay for at least part of a transaction conducted with one of the customer account(s) 186.

When the customer 102A has turned off autopay and earns one or more points, the points processing computing device(s) 130 stores the point(s) in the earned points account 136. After the completion of the first billing cycle, the points processing computing device(s) 130 transfers any points stored in the earned points account 136 to the available points account 137. Any points stored in the available points account 137 are not automatically applied to the rewards account 144 and may be redeemed at the second merchant 180 (e.g., on the e-commerce website 188).

Figure 3:
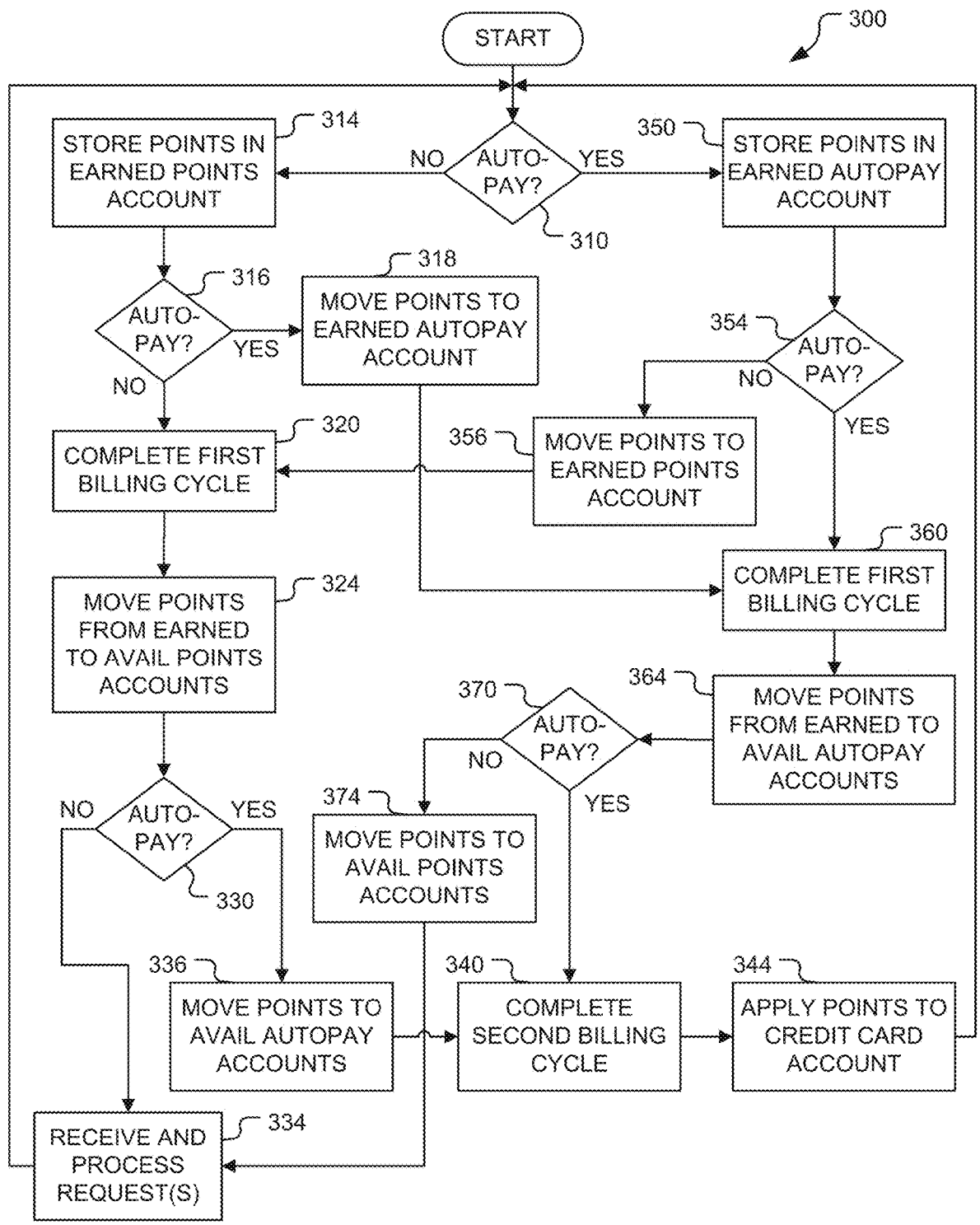
FIG. 3 is a flow diagram of a method performed by the points processing computing device of the system of FIG. 1.

FIG. 3 is a flow diagram of a method 300 performed by the points processing computing device(s) 130 (see FIG. 1). In first decision block 310, referring to FIG. 1, the points processing computing device(s) 130 determines whether the customer 102A has turned on autopay. The decision in decision block 310 (see FIG. 3) is "YES," when the customer 102A has turned on autopay. Otherwise, the decision in decision block 310 (see FIG. 3) is "NO."

When the decision in decision block 310 (see FIG. 3) is "NO," in block 314 (see FIG. 3), the points processing computing device(s) 130 determine how many points have been earned by the customer 102A and stores them in the earned points account 136. For example, the merchant computing device 172 and/or the POS device(s) 174 may communicate sales information to the points processing computing device(s) 130 that the points processing computing device(s) 130 uses to determine how many points were earned by the customer 102A. As mentioned above, the points stored in the earned points account 136 are not yet available for use by the customer 102A.

The customer 102A may decide to turn on autopay before the first billing cycle. In decision block 316 (see FIG. 3), the points processing computing device(s) 130 determines whether the customer 102A has turned on autopay. The decision in decision block 316 (see FIG. 3) is "YES," when the customer 102A has turned on autopay. Otherwise, the decision in decision block 316 (see FIG. 3) is "NO."

When the decision in decision block 316 (see FIG. 3) is "YES," in block 318 (see FIG. 3), the points processing computing device(s) 130 move any points stored in the earned points account 136 to the earned autopay account 134. In block 318 (see FIG. 3), the points processing computing device(s) 130 transfers the points instantly to avoid any potential for duplication of the points, which might occur if the same points appeared in both accounts at the same time. Then, the points processing computing device(s) 130 advances to block 360 (see FIG. 3) whereat the points processing computing device(s) 130 completes the first billing cycle.

When the decision in decision block 316 (see FIG. 3) is "NO," the points processing computing device(s) 130 completes the first billing cycle in block 320 (see FIG. 3).

In next block 324 (see FIG. 3), the points processing computing device(s) 130 moves the point(s) stored in the earned points account 136 to the available points account 137.

In decision block 330 (see FIG. 3), the points processing computing device(s) 130 determines whether the customer 102A has indicated since the completion of the first billing cycle whether any of the point(s) stored in the available points account 137 should be applied automatically to the rewards account 144. In other words, the points processing computing device(s) 130 determine whether the customer 102A has turned on autopay. The decision in decision block 330 (see FIG. 3) is "YES," when the customer 102A has turned on autopay. Otherwise, the decision in decision block 330 (see FIG. 3) is "NO."

When the decision in decision block 330 (see FIG. 3) is "NO," in block 334 (see FIG. 3), the points processing computing device(s) 130 receives one or more requests (e.g., from the e-commerce website 188) to redeem at least some of the point(s) stored in the available points account 137. In block 334 (see FIG. 3), the points processing computing device(s) 130 processes the request(s) and redeems the point(s). Then, the points processing computing device(s) 130 returns to decision block 310 (see FIG. 3).

On the other hand, when the decision in decision block 330 (see FIG. 3) is "YES," the points processing computing device(s) 130 advances to block 336 (see FIG. 3) and moves the point(s) from the available points account 137 to the available autopay account 135. In block 336 (see FIG. 3), the points processing computing device(s) 130 transfers the points instantly to avoid any potential for duplication of the points, which might occur if the same points appeared in both accounts at the same time.

Then, in block 340 (see FIG. 3), the points processing computing device(s) 130 completes the second billing cycle. In next block 344 (see FIG. 3), the points processing computing device(s) 130 applies the point(s) in the available autopay account 135 to the rewards account 144. Then, the points processing computing device(s) 130 returns to decision block 310 (see FIG. 3).

When the decision in decision block 310 (see FIG. 3) is "YES," in block 350 (see FIG. 3), the points processing computing device(s) 130 determines how many points have been earned by the customer 102A and stores them in the earned autopay account 134.

The customer 102A may decide to turn off autopay before the first billing cycle. In decision block 354 (see FIG. 3), the points processing computing device(s) 130 determines whether the customer 102A has turned off autopay. The decision in decision block 354 (see FIG. 3) is "NO," when the customer 102A has turned off autopay. Otherwise, the decision in decision block 316 (see FIG. 3) is "YES."

When the decision in decision block 354 (see FIG. 3) is "NO," in block 356 (see FIG. 3), the points processing computing device(s) 130 moves any points stored in the earned autopay account 134 to the earned points account 136. In block 356 (see FIG. 3), the points processing computing device(s) 130 transfers the points instantly to avoid any potential for duplication of the points, which might occur if the same points appeared in both accounts at the same time. Then, the points processing computing device(s) 130 advances to block 320 (see FIG. 3) whereat the points processing computing device(s) 130 completes the first billing cycle.

When the decision in decision block 354 (see FIG. 3) is "YES," the points processing computing device(s) 130 completes the first billing cycle in block 360 (see FIG. 3).

In next block 364 (see FIG. 3), the points processing computing device(s) 130 moves the point(s) stored in the earned autopay account 134 to the available autopay account 135.

In decision block 370 (see FIG. 3), the points processing computing device(s) 130 determines whether the customer 102A has indicated since the completion of the first billing cycle whether the point(s) stored in the available autopay account 135 should be moved to the available points account 137. In other words, the points processing computing device(s) 130 determine whether the customer 102A has turned off autopay. The decision in decision block 370 (see FIG. 3) is "NO," when the customer 102A has turned off autopay. Otherwise, the decision in decision block 370 is "YES."

When the decision in decision block 370 (see FIG. 3) is "NO," in block 374 (see FIG. 3), the points processing computing device(s) 130 moves any point(s) stored in the available autopay account 135 to the available points account 137. In block 374 (see FIG. 3), the points processing computing device(s) 130 transfers the points instantly to avoid any potential for duplication of the points, which might occur if the same points appeared in both accounts at the same time. Then, the points processing computing device(s) 130 advances to block 334 (see FIG. 3).

On the other hand, when the decision in decision block 370 (see FIG. 3) is "YES," the points processing computing device(s) 130 advances to block 340 (see FIG. 3) whereat the points processing computing device(s) 130 completes the second billing cycle.

Referring to FIG. 1, anytime during the method 300 (see FIG. 3), a requesting computing device, such as the point of sale device 174, the merchant computing device(s) 172, the merchant computing device(s) 182, and/or one of the customer computing devices 150, may send a request to the reward redemption computing device(s) 140 inquiring about how many points a particular one of the customers 102 has available. For example, FIG. 2 illustrates an example in which the merchant computing device(s) 182 send a get balance request 212 to the reward redemption computing device(s) 140 during checkout, which occurs in block 334 of FIG. 3. When this occurs, referring to FIG. 2, the reward redemption computing device(s) 140 may send a balance inquiry 214 to the points processing computing device(s) 130. The balance inquiry 214 may request a number of points stored in the available autopay account 135 and the available points account 137 and/or a monetary value of those points. The points processing computing device(s) 130 respond with a balance response 216. The balance response 216 may include the numbers of points stored in each of the available autopay account 135 and the available points account 137. Alternatively, the balance response 216 may include the monetary values of points stored in each of the available autopay account 135 and the available points account 137. By way of another non-limiting example, the balance response 216 may include a total number of points stored in these accounts and/or a total monetary value thereof. Then, the reward redemption computing device(s) 140 sends a balance response 218 to the merchant computing device(s) 182 including any of the aforementioned values.

Referring to FIG. 1, by way of another non-limiting example, after the completion of the first billing cycle, the points processing computing device(s) 130 may forward the balances of the available autopay account 135 and the available points account 137 to the reward redemption computing device(s) 140. The reward redemption computing device(s) 140 may store this information in the cache 148. The reward redemption computing device(s) 140 may use the cache 148 to calculate the total points available and/or the total monetary value thereof and provide this information to the merchant computing device(s) 182 in the balance response 218. In such an embodiment, the balance inquiry 214 is sent only if the cache 148 is unavailable or does not include the information requested.

For example, when the customer 102A wishes to make a purchase at the e-commerce website 188 generated by the merchant computing device(s) 182, the e-commerce website 188 may automatically query the reward redemption computing device(s) 140 for the total number of points available and/or the total monetary value thereof. The reward redemption computing device(s) 140 responds with the balance response 218, which includes the total points and/or total monetary value thereof according to the cache 148. The e-commerce website 188 may optionally display this information to the customer 102A who decides whether to use the points toward the purchase.

The cache 148 allows the points to be used in real-time to reduce the price of the purchase. Referring to FIG. 2, if the customer 102A (see FIG. 1) decides to use the points toward the purchase, the merchant computing device(s) 182 sends a points authorization request 222 to the reward redemption computing device(s) 140. If the reward redemption computing device(s) 140 is maintaining the cache 148, the reward redemption computing device(s) 140 subtracts the points from the cache 148 and sends a points redemption request 224 to the points processing computing device(s) 130 so the points processing computing device(s) 130 can update the available autopay account 135 and/or the available points account 137. If some of the points are subtracted from the available autopay account 135, the points redemption request 224 may instruct the points processing computing device(s) 130 to turn off autopay. The reward redemption computing device(s) 140 may move any points stored in the available autopay account 135 to the available points account 137 to remain consistent with the points processing computing device(s) 130. The points processing computing device(s) 130 send a redemption confirmation 226 to the reward redemption computing device(s) 140. Then, the reward redemption computing device(s) 140 sends a redemption confirmation 228 to the merchant computing device(s) 182. After the next billing cycle completes, the points processing computing device(s) 130 forwards the balances of the available autopay account 135 and the available points account 137 to the reward redemption computing device(s) 140, which updates the cache 148 using this information.

Alternatively, if the reward redemption computing device(s) 140 is not maintaining the cache 148, the reward redemption computing device(s) 140 sends the points redemption request 224 to the points processing computing device(s) 130. The points processing computing device(s) 130 subtracts the points from the available autopay account 135 and/or the available points account 137. If some of the points are subtracted from the available autopay account 135, the points processing computing device(s) 130 turns off autopay. Then, the points processing computing device(s) 130 sends the redemption confirmation 226 to the reward redemption computing device(s) 140. Next, the reward redemption computing device(s) 140 sends the redemption confirmation 228 to the merchant computing device(s) 182.

Such real-time lookup and redemption of points is an improvement over prior art systems which did not provide these features. For example, these real-time features require support of a large number of transactions (e.g., about 600 transactions per second) of which many (e.g., about 90%) may be lookups. Prior art systems enable only about 50 transactions per second, which is insufficient to enable real-time lookup and redemption of points. For example, if the points processing computing device(s) 130 is/are configured to perform only about 50 transactions per second, the cache 148 may be used to provide real-time lookup and redemption.

Computing Device

Figure 4:
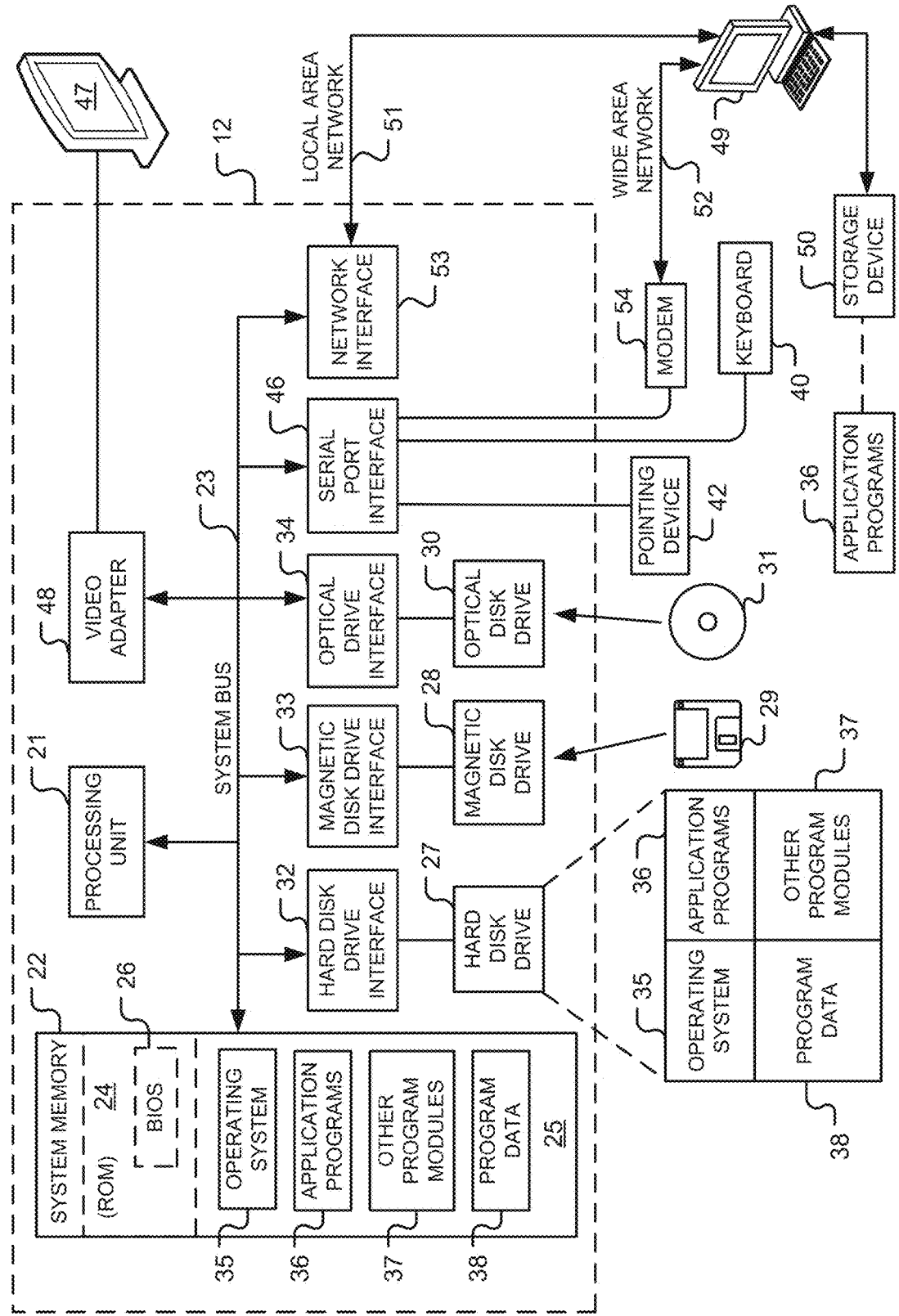
FIG. 4 is a diagram of a hardware environment and an operating environment in which the computing devices of the system of FIG. 1 may be implemented.

FIG. 4 is a diagram of hardware and an operating environment in conjunction with which implementations of the one or more computing devices of the system 100 may be practiced. The description of FIG. 4 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 4 includes a general-purpose computing device in the form of the computing device 12. Each of the computing devices of FIG. 1 (including the devices 130, 140, 150, 172, 182, and 174) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 4 include a local-area network (LAN) 51 and a wide-area network (WAN) 52. Such networking environments are commonplace in offices, enterprise-wide computer networks, intranets and the Internet. The network 160 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 300 illustrated in FIG. 3 and the interactions illustrated in FIG. 2) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A computer-implemented method comprising:
reducing a computational load at a reward redemption computing module of an issuer computing device by maintaining a cache with a cached reward point value generated from an available reward point value, wherein the available reward point value is derived from earned points and associated with a credit account, and wherein the available reward point value is maintained at a reward redemption computing device separate from the issuer computing device;
facilitating a credit transaction using credit from the credit account;
facilitating generation of new earned points for the credit account based on the credit transaction;
receiving, at the issuer computing device, an updated reward point value associated with the credit transaction, wherein the updated reward point value includes the new earned points;
updating the cached reward point value using the updated reward point value;
receiving a points authorization request as part of a points transaction associated with a merchant system and a purchase;
reducing the computational load by subtracting points from the cached reward point value to allow a real-time reduction in a price of the purchase;

transmitting, by the issuer computing device, a points redemption confirmation, wherein when the points redemption request is received at the points processing computing device, the points redemption request instructs the points processing computing device to turn off autopay;

synchronizing the cached reward point value using the points redemption confirmation, thereby reducing the computational load associated with synchronization during the real-time reduction in the price while maintaining consistency between the cached reward point value and the available reward point value following the real-time reduction in the price of the purchase.

2. The computer-implemented method of claim 1, further comprising:

receiving a balance request associated with the available reward point value; and automatically generating a balance response when a memory device associated with the issuer computing device is available and includes the cached reward point value requested by the balance request, wherein the balance response is generated using the cached reward point value in the memory device without contacting the reward redemption computing device.

3. The computer-implemented method of claim 1, further comprising:

receiving a balance request associated with the cached reward point value, wherein the balance request is associated with a merchant computing device;

generating a balance response without contacting the reward redemption computing device; and automatically transmitting the balance response, wherein when the balance response is received at the merchant computing device, wherein a memory device associated with the merchant computing device facilitates real-time use of the cached reward point value from the issuer computing device.

4. The computer-implemented method of claim 1, further comprising:

receiving the points authorization request, the points authorization request requesting a first transaction amount including at least one of a particular monetary value and a transaction number of points, the particular monetary value corresponding to the transaction number of points; and subtracting, by the issuer computing device, a second transaction amount from the updated reward point value, the second transaction amount including at least one of the particular monetary value and the transaction number of points.

5. The computer-implemented method of claim 1, further comprising:

receiving the points authorization request for a transaction amount;

subtracting a payment point value associated with the transaction amount from the cached reward point value in a memory device associated with the issuer computing device; and automatically responding to the points authorization request by sending a points redemption communication after subtracting the payment point value from the memory device.

6. The computer-implemented method of claim 1, further comprising:

receiving an autopay setting, wherein receiving includes checking for a status of the autopay setting, wherein the autopay setting is in an off setting or an on setting; and switching, if the autopay setting is in the on setting, the autopay setting to the off setting.

7. The computer-implemented method of claim 1, further comprising:

receiving the points authorization request, the points authorization request requesting a first transaction amount including at least one of a particular monetary value and a transaction number of points, the particular monetary value corresponding to the transaction number of points;

subtracting, by the issuer computing device, a second transaction amount from the updated reward point value, the second transaction amount including at least one of the particular monetary value and the transaction number of points; and transmitting, to a payment processing device, a third transaction amount from the updated reward point value, the third transaction amount including at least one of the particular monetary value and the transaction number of points.

8. A reward redemption computing device comprising:

a memory; and one or more processors coupled to the memory, the one or more processors configured to perform operations comprising:

reducing a computational load at a reward redemption computing module of an issuer computing device by maintaining a cache with a cached reward point value generated from an available reward point value, wherein the available reward point value is derived from earned points and associated with a credit account, and wherein the available reward point value is maintained at a reward redemption computing device separate from the issuer computing device;

facilitating a credit transaction using credit from the credit account;

facilitating generation of new earned points for the credit account based on the credit transaction;

receiving, at the issuer computing device, an updated reward point value associated with the credit transaction, wherein the updated reward point value includes the new earned points;

updating the cached reward point value using the updated reward point value;

receiving a points authorization request as part of a points transaction associated with a merchant system and a purchase;

reducing the computational load by subtracting points from the cached reward point value to allow a real-time reduction in a price of the purchase;

transmitting, by the issuer computing device, a points redemption confirmation, wherein when the points redemption request is received at the points processing computing device, the points redemption request instructs the points processing computing device to turn off autopay;

synchronizing the cached reward point value using the points redemption confirmation, thereby reducing the computational load associated with synchronization during the real-time reduction in the price while maintaining consistency between the cached reward point value and the available reward point value following the real-time reduction in the price of the purchase.

9. The reward redemption computing device of claim 8, wherein the one or more processors are further configured to perform operations comprising:

receiving a balance request associated with the available reward point value; and automatically generating a balance response when a memory device associated with the issuer computing device is available and includes the cached reward point value requested by the balance request, wherein the balance response is generated using the cached reward point value in the memory device without contacting the reward redemption computing device.

10. The reward redemption computing device of claim 8, wherein the one or more processors are further configured to perform operations comprising:

receiving a balance request associated with the cached reward point value, wherein the balance request is associated with a merchant computing device;

generating a balance response without contacting the reward redemption computing device; and automatically transmitting the balance response, wherein when the balance response is received at the merchant computing device, wherein a memory device associated with the merchant computing device facilitates real-time use of the cached reward point value from the issuer computing device.

11. The reward redemption computing device of claim 8, wherein the one or more processors are further configured to perform operations comprising:

receiving the points authorization request, the points authorization request requesting a first transaction amount including at least one of a particular monetary value and a transaction number of points, the particular monetary value corresponding to the transaction number of points; and subtracting, by the issuer computing device, a second transaction amount from the updated reward point value, the second transaction amount including at least one of the particular monetary value and the transaction number of points.

12. The reward redemption computing device of claim 8, wherein the one or more processors are further configured to perform operations comprising:

receiving the points authorization request for a transaction amount;

subtracting a payment point value associated with the transaction amount from the cached reward point value in a memory device associated with the issuer computing device; and automatically responding to the points authorization request by sending a points redemption communication after subtracting the payment point value from the memory device.

13. The reward redemption computing device of claim 8, wherein the one or more processors are further configured to perform operations comprising:

receiving an autopay setting, wherein receiving includes checking for a status of the autopay setting, wherein the autopay setting is in an off setting or an on setting; and switching, if the autopay setting is in the on setting, the autopay setting to the off setting.

14. The reward redemption computing device of claim 8, wherein the one or more processors are further configured to perform operations comprising:

receiving the points authorization request, the points authorization request requesting a first transaction amount including at least one of a particular monetary value and a transaction number of points, the particular monetary value corresponding to the transaction number of points;

subtracting, by the issuer computing device, a second transaction amount from the updated reward point value, the second transaction amount including at least one of the particular monetary value and the transaction number of points; and transmitting, to a payment processing device, a third transaction amount from the updated reward point value, the third transaction amount including at least one of the particular monetary value and the transaction number of points.

15. A non-transitory computer readable medium comprising instructions that, when executed by one or more processors of a reward redemption computing device, cause the reward redemption computing device to perform operations comprising:

reducing a computational load at a reward redemption computing module of an issuer computing device by maintaining a cache with a cached reward point value generated from an available reward point value, wherein the available reward point value is derived from earned points and associated with a credit account, and wherein the available reward point value is maintained at a reward redemption computing device separate from the issuer computing device;

facilitating a credit transaction using credit from the credit account;

facilitating generation of new earned points for the credit account based on the credit transaction;

receiving, at the issuer computing device, an updated reward point value associated with the credit transaction, wherein the updated reward point value includes the new earned points;

updating the cached reward point value using the updated reward point value;

receiving a points authorization request as part of a points transaction associated with a merchant system and a purchase;

reducing the computational load by subtracting points from the cached reward point value to allow a real-time reduction in a price of the purchase;

transmitting, by the issuer computing device, a points redemption confirmation, wherein when the points redemption request is received at the points processing computing device, the points redemption request instructs the points processing computing device to turn off autopay;

synchronizing the cached reward point value using the points redemption confirmation, thereby reducing the computational load associated with synchronization during the real-time reduction in the price while maintaining consistency between the cached reward point value and the available reward point value following the real-time reduction in the price of the purchase.

16. The non-transitory computer readable medium of claim 15, wherein the instructions further cause the one or more processors to perform operations comprising:

receiving a balance request associated with the available reward point value; and automatically generating a balance response when a memory device associated with the issuer computing device is available and includes the cached reward point value requested by the balance request, wherein the balance response is generated using the cached reward point value in the memory device without contacting the reward redemption computing device.

17. The non-transitory computer readable medium of claim 15, wherein the instructions further cause the one or more processors to perform operations comprising:

receiving a balance request associated with the cached reward point value, wherein the balance request is associated with a merchant computing device;

generating a balance response without contacting the reward redemption computing device; and automatically transmitting the balance response, wherein when the balance response is received at the merchant computing device, wherein a memory device associated with the merchant computing device facilitates real-time use of the cached reward point value from the issuer computing device.

18. The non-transitory computer readable medium of claim 15, wherein the instructions further cause the one or more processors to perform operations comprising:

receiving the points authorization request, the points authorization request requesting a first transaction amount including at least one of a particular monetary value and a transaction number of points, the particular monetary value corresponding to the transaction number of points; and subtracting, by the issuer computing device, a second transaction amount from the updated reward point value, the second transaction amount including at least one of the particular monetary value and the transaction number of points.

19. The non-transitory computer readable medium of claim 15, wherein the instructions further cause the one or more processors to perform operations comprising:

receiving the points authorization request for a transaction amount;

subtracting a payment point value associated with the transaction amount from the cached reward point value in a memory device associated with the issuer computing device; and automatically responding to the points authorization request by sending a points redemption communication after subtracting the payment point value from the memory device.

20. The non-transitory computer readable medium of claim 15, wherein the instructions further cause the one or more processors to perform operations comprising:

receiving an autopay setting, wherein receiving includes checking for a status of the autopay setting, wherein the autopay setting is in an off setting or an on setting; and switching, if the autopay setting is in the on setting, the autopay setting to the off setting.

21. The non-transitory computer readable medium of claim 15, wherein the instructions further cause the one or more processors to perform operations comprising:

receiving the points authorization request, the points authorization request requesting a first transaction amount including at least one of a particular monetary value and a transaction number of points, the particular monetary value corresponding to the transaction number of points;

subtracting, by the issuer computing device, a second transaction amount from the updated reward point value, the second transaction amount including at least one of the particular monetary value and the transaction number of points; and transmitting, to a payment processing device, a third transaction amount from the updated reward point value, the third transaction amount including at least one of the particular monetary value and the transaction number of points.

\* \* \* \* \*